Figures 1, 2:
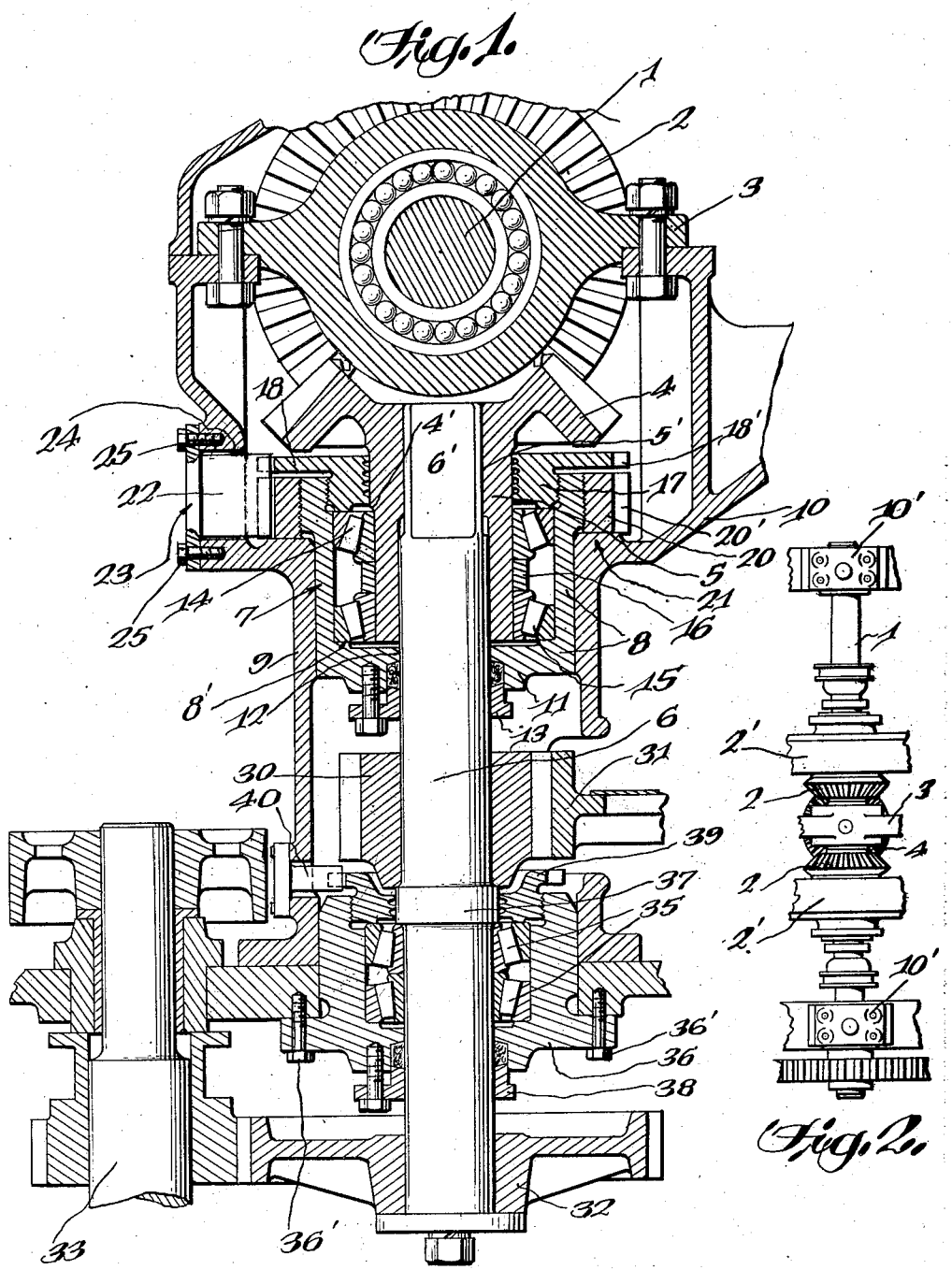

June 16, 1931. R. LJUNGKULL 1,810,489
POWER TRANSMISSION MECHANISM
Filed Sept. 18, 1929

Inventor
Rolf Ljungkull
Attorneys

Patented June 16, 1931

1,810,489

UNITED STATES PATENT OFFICE

ROLF LJUNGKULL, OF WAUWATOSA, WISCONSIN, ASSIGNOR TO HARNISCHFEGER CORPORATION, MILWAUKEE, WISCONSIN, A CORPORATION OF WISCONSIN

POWER TRANSMISSION MECHANISM

Application filed September 18, 1929. Serial No. 393,561.

This invention relates to power transmission mechanism especially adapted for use in connection with cranes or excavating machinery such as power shovels, drag lines and the like.

In connection with machinery of this character it is common practice to utilize an internal combustion engine or other type of power plant to drive a horizontally disposed jack shaft supported for rotation in bearings provided on the main frame of the machine. On this jack shaft confronting or oppositely arranged bevel gears are loosely mounted, but are selectively clutched to the jack shaft as desired. Both bevel gears mesh with a single driven bevel gear which is ordinarily fixed to the upper end of a vertical shaft. Motion is taken from the vertical shaft for driving the boom hoist, the swing gear for the revolving platform and the traction devices, usually endless flexible belts, employed for propelling the machine. The bevel gears on the jack shaft and their clutches provide for the necessary reversal of the motion supplied to the boom hoist, swing gear, and traction devices. Ordinarily the vertical shaft referred to is positioned beneath and extends downwardly from the jack shaft. This along with the enclosure of the gearing and shafting in a casing integral with or suitably connected to the main frame and certain other well known features of this organization makes it difficult to effect the adjustment required to secure and maintain proper intermeshing of the bevel gears and also makes it difficult to remove and replace or repair the vertical shaft or associated parts in the event of breakage or the like. In practically all prior construction, access to the vertical shaft, the driven bevel gear and its bearing, and the other parts associated therewith, is had only by removing the jack shaft from its bearings and taking down practically the entire mechanism.

One of the principal objects of the present invention is to provide a power transmission mechanism of this character which, without removal of any of the parts of the mechanism provides for ready and easy adjustment of the bearing for the driven bevel gear in order that this bevel gear may be made to properly mesh with the driving bevel gear to compensate for slight inaccuracies in machining or for wear.

Another object of the present invention is to provide an adjustment of this character for the driven bevel gear which does not impair or disturb the alignment of intermeshing of the gearing driven from the vertical shaft.

A further object is to permit of easy removal of the vertical shaft without the necessity of dismantling the jack shaft or other major parts of the mechanism.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in longitudinal vertical section and partly in side elevation showing a power transmission mechanism of an excavating machine embodying the present invention; and Figure 2 is a fragmentary plan view of the jack shaft and its reversing bevel gears.

Referring to the drawings, the numeral 1 designates a jack shaft driven in a conventional manner from the power plant (not shown) of the excavating machine and having its ends rotatably supported in bearings 10' provided therefor on the main frame casting 10. On the jack shaft 1, the usual confronting or oppositely arranged bevel gears 2 are loosely mounted and are selectively clutched to the jack shaft by means of the usual clutches 2'. In between the bevel gears a bearing 3 is provided for the jack shaft. This reversing bevel gearing and clutch arrangement of the jack shaft is well known and widely used and as it of itself forms no part of the present invention it has not been shown in detail.

Below the jack shaft 1, a driven bevel gear 4 is provided and constantly meshes with the bevel gears 2. The elongated hub 5 of the gear 4 has a longitudinal bore or opening, at least a portion 5' of which is of polygonal, preferably square, formation in cross section. A vertical shaft 6 is provided and has its upper end 6' of similar polygonal or square formation and adapted to snugly and slidably fit in the correspondingly formed portion 5' of the hub 5 of the gear wheel 4 whereby the shaft 6 and gear wheel 4 are constrained to rotate together but are free to move axially or longitudinally relative to each other.

An adjustable bearing designated generally at 7 is provided for the gear 4. The bearing 7 comprises a cylindrical casing 8 slidably fitted in a correspondingly formed guide and support 9, preferably integral with the casting 10. As shown the guide and support 9 is formed by a portion of the gear casing which encloses and protects the gearing and shafting. The gear casing may be integral with or suitably connected to the main frame casting. The lower end of the casing 8 is closed by an end wall 11 having an opening 12 through which the vertical shaft 6 passes and also provided with a stuffing box 13 for this shaft. Within the casing 8 upper and lower bearing assemblies 14 and 15 are provided, these bearing assemblies being of conventional construction and being maintained in spaced relation to each other by a spacing collar 16. A take-up is provided for the bearing assemblies and consists of a take-up bushing 17 threaded into the open upper end of the casing 8 and bearing against the outer race member of the upper bearing assembly. The take-up bushing 17 is provided with an outwardly extending flange 18, the periphery of which is notched or slotted as at 18' to facilitate adjustment and provide for the securing of the take-up bushing in adjusted position in a manner which will be hereinafter more fully described. As shown in the drawings the bearing assemblies 14 and 15 in the casing 8 directly coact with the hub 5 of the gear 4 and are designed to take a downward thrust as well as radial load, the outer race member of the lower bearing assembly resting on a shoulder 8' provided in the lower end or bottom of the casing 8 and the inner race member of the upper bearing assembly engaging a shoulder 4' provided on the hub of the gear 4.

For the purpose of adjusting the casing 8 and the bearing assemblies 14 and 15 therein as a unit and thereby advancing the bevel gear 4 toward or retracting the same from the bevel gear wheels 2, an adjusting collar 20 is threadedly connected with the exterior of the upper end of the casing 8 and bears against a seat 21 provided therefore on the casting 10. The periphery of the adjusting collar 20 is slotted or notched as at 20' to facilitate adjustment of the collar and to provide for the locking of the same in adjusted position. The adjusting collar 20 and the takeup bushing 17 are both secured in adjusted position by means of a lock lug 22 integrally formed with or otherwise suitably connected to a plate 23. The plate 23 provides a cover for an opening 24 formed in the casting 10 opposite the adjusting collar 20 and take-up bushing 17 and when put in place the cover 23 is secured in position by means of stud bolts 25. When the plate 23 is secured in position the lug 22 projects inwardly through the opening 24 and into the notches 18' and 20' of the take-up bushing and adjusting collar that are aligned with the lug thereby securing the take-up bushing and adjusting collar in position. By removing the plate 23 convenient access is had to both the take-up bushing 18 and adjusting collar 20.

When the collar 20 is adjusted in one direction it raises the bearing casing 8 and the bearing assembly therein and consequently moves the gear wheel 4 axially upward to cause its teeth to properly intermesh with the teeth of the gear wheels 22. Reverse adjustment of the collar 20 correspondingly lowers the gear wheel 4. This adjustment and the gear wheel 4 does not disturb the position of the shaft 6 inasmuch as the gear wheel 4 is slidably fitted or splined on the shaft 6. This is an important feature of the invention inasmuch as gearing coacts with the shaft 6 to drive the boom hoist, the swing gear for the revolving platform and the traction devices and the alignment of the gearing should not be impaired. Thus, a pinion 30 is keyed to the shaft 6 just below the stuffing box 13 and meshes with a large gear wheel 31, only a fragment of which is shown. The gear wheel 31 connects with the usual clutch controlled gear trains (not shown) for driving the swing gear and the traction devices of the machine. The lower end of the shaft has a gear wheel 32 secured thereto and operating to drive the boom hoist mechanism, a portion of which is shown at 33. It will now be understood that the adjustment of the gear 4 does not disturb the alignment in any way of the pinion 30 with its gear wheel 31 or of the gear wheel 32 with its boom hoist mechanism.

The shaft 6 is supported in position by means of bearing assemblies 35 carried in a casing 36 with the upper bearing assembly engaged below a shoulder or enlargement 37 formed integral with the shaft 6 and the lower bearing assembly supported on the casing 36. The casing 36 is detachably secured to the main frame casting 10 by means of stud bolts 36' and has a stuffing box 38 for the shaft 6. A take-up bushing 39 is provided for the bearing assemblies 35, the bushing 39 being threaded into the casing 36 and bearing against the outer race member of the upper bearing unit of the bearing assemblies 35, the outer race member of the lower bearing assembly being engaged with the lower end of the casing 36. The flange of the take-up bushing 39 is notched or slotted to coact with a locking device 40 similar to the locking device 22, 23 above described.

By removing the bolts 38 the shaft 6 with its pinion 30, gear wheel 32 and bearing mechanism 35, 36, 37 may be dropped down and disassembled from the machine without in any way disturbing the jack shaft or any of the mapor instrumentalities of the mechanism and without impairing the adjustment of the gear 4. This greatly facilitates repairs and replacement as it avoids the substantial amount of dismantling heretofore necessary.

The invention claimed is:

1. In a machine of the character described, a main frame, a horizontally disposed jack shaft rotatably mounted on the main frame, clutch controlled oppositely disposed driving bevel gears mounted on said jack shaft, a driven bevel gear meshed with said driving bevel gears, means on said main frame providing a gear casing and a combined bearing support and guide, a bearing for said driven bevel gear including a bearing assembly coacting therewith, a casing for said bearing assembly, said bearing assembly being slidably fitted in said combined bearing support and guide, an adjusting collar threaded on said bearing casing, said gear casing having a seat on which said adjusting collar is supported, said gear casing also having an opening through which access is had to said adjusting collar, a vertical shaft having its upper end slidably interfitted with the driven bevel gear to be constrained to rotate therewith and yet free to move axially relative thereto, and a separate bearing detachably connected to the gear casing and coacting with the shaft.

2. In a machine of the character described, a main frame, a horizontally disposed jack shaft rotatably mounted on the main frame, clutch controlled oppositely disposed driving bevel gears mounted on said jack shaft, a driven bevel gear meshed with said driving bevel gears and having an elongated hub, means on said main frame providing a gear casing and a combined bearing support and guide, a bearing for said driven bevel gear including a bearing assembly coacting with the hub thereof, a casing for said bearing assembly, said bearing assembly being slidably fitted in said combined bearing support and guide, a take-up bushing threadedly engaged with the casing and coacting with the bearing assembly, an adjusting collar threaded on said bearing casing, said gear casing having a seat on which said adjusting collar is supported, a vertical shaft having its upper end slidably interfitted with the hub of the driven bevel gear to be constrained to rotate therewith and yet free to move axially relative thereto, said vertical shaft being adapted for connection with gearing for driving swing gear, traction devices and a boom hoist, and a separate bearing detachably connected to the gear casing and coacting with the shaft adjacent the lower end thereof.

3. In a machine of the character described, a main frame, a horizontally disposed jack shaft rotatably mounted on the main frame, clutch controlled oppositely disposed driving bevel gears mounted on said jack shaft, a driven bevel gear meshed with said driving bevel gears and having an elongated hub, means on said main frame providing a gear casing and a combined bearing support and guide, a bearing for said driven bevel gear including a bearing assembly coacting with the hub thereof, a casing for said bearing assembly, said bearing assembly being slidably fitted in said combined bearing support and guide, a take-up bushing threadedly engaged with the casing and coacting with the bearing assembly, an adjusting collar threaded on said bearing casing, said gear casing having a seat on which said adjusting collar is supported, common means for releasably securing the take-up bushing and adjusting collar in adjusted position, a vertical shaft having its upper end slidably interfitted with the hub of the driven bevel gear to be constrained to rotate therewith and yet free to move axially relative thereto, said vertical shaft being adapted for connection with gearing for driving swing gear, traction devices and a boom hoist, and a separate bearing detachably connected to the gear casing and coacting with the shaft adjacent the lower end thereof.

4. In a machine of the character described, a main frame, a horizontally disposed jack shaft rotatably mounted on the main frame, clutch controlled oppositely disposed driving bevel gears mounted on said jack shaft, a driven bevel gear meshed with said driving bevel gears, means on said main frame providing a gear casing enclosing said driven bevel gear, a combined bearing support and guide provided in said gear casing and a bearing for said driven bevel gear adjustably mounted in said combined bearing support and guide, an adjusting device for said bearing, said gear casing having an opening through which access is had to said adjusting device, a vertical shaft having its upper end slidably fitted with the hub of the bevel driven gear to be constrained to rotate therewith and yet free to move axially relative thereto, said vertical shaft being adapted for connection with gearing for driving swing gear, traction devices, and a boom hoist, and a separate bearing for the shaft detachably connected to the gear casing.

5. In a machine of the character described, a main frame, a horizontally disposed jack shaft rotatably mounted on the main frame, clutch controlled oppositely disposed driving bevel gears mounted on said jack shaft, a driven bevel gear meshed with said driving bevel gears, means on said main frame providing a gear casing enclosing said driven bevel gear, a combined bearing support and guide provided in said gear casing and a bearing for said driven bevel gear adjustably mounted in said combined bearing support and guide, an adjusting device for said bearing, said gear casing having an opening through which access is had to said adjusting device, a cover for said opening having a locking element cooperable with the adjusting device for securing the same in adjusted position, a vertical shaft having its upper end slidably fitted with the hub of the bevel driven gear to be constrained to rotate therewith and yet free to move axially relative thereto, said vertical shaft being adapted for connection with gearing for driving swing gear, traction devices, and a boom hoist, and a separate bearing for the shaft detachably connected to the gear casing.

In witness whereof, I hereto affix my signature.

ROLF LJUNGKULL.